(12) United States Patent
Carnell et al.

(10) Patent No.: US 8,956,428 B2
(45) Date of Patent: Feb. 17, 2015

(54) APPARATUS AND PROCESS FOR TREATING OFFSHORE NATURAL GAS

(75) Inventors: Peter John Herbert Carnell, Stockton on Tees (GB); Ginny Yuen Che Ng, East Perth (AU)

(73) Assignee: Johnson Matthey PLC, London (GB)

( * ) Notice: Subject to any disclaimer, the term of this patent is extended or adjusted under 35 U.S.C. 154(b) by 1074 days.

(21) Appl. No.: 13/003,421

(22) PCT Filed: Jun. 15, 2009

(86) PCT No.: PCT/GB2009/050678
§ 371 (c)(1),
(2), (4) Date: Apr. 1, 2011

(87) PCT Pub. No.: WO2010/004300
PCT Pub. Date: Jan. 14, 2010

(65) Prior Publication Data
US 2011/0174016 A1    Jul. 21, 2011

(30) Foreign Application Priority Data
Jul. 11, 2008 (GB) .................... 0812699.7

(51) Int. Cl.
*C10J 3/46* (2006.01)
*C01B 3/24* (2006.01)
(Continued)

(52) U.S. Cl.
CPC ............... *F25J 1/0022* (2013.01); *C01B 3/38* (2013.01); *C10L 3/08* (2013.01); *C10L 3/102* (2013.01);
(Continued)

(58) Field of Classification Search
USPC ......... 48/197 R, 198.1, 198.3, 198.7; 62/620, 62/611, 613; 518/700, 705
See application file for complete search history.

(56) References Cited

U.S. PATENT DOCUMENTS 6,564,579 B1    5/2003   McCartney
6,743,829 B2 *  6/2004   Fischer-Calderon et al. . 518/700
(Continued)

FOREIGN PATENT DOCUMENTS

GB    1453081    10/1976
GB    2229519    9/1990
(Continued)

OTHER PUBLICATIONS

International Search Report for PCT/GB2009/050678 dated Oct. 6, 2009.
(Continued)

*Primary Examiner* — Kaity Handal
(74) *Attorney, Agent, or Firm* — RatnerPrestia

(57) ABSTRACT

A process for treating offshore natural gas includes processing the natural gas on an off-shore processing facility by, (i) liquefying and fractionating the natural gas to generate a liquefied natural gas stream and a higher hydrocarbon stream, (ii) vaporizing at least a portion of the higher hydrocarbon stream, (iii) passing the vaporized higher hydrocarbon stream and steam over a steam reforming catalyst to generate a reformed gas mixture comprising methane, steam, carbon oxides and hydrogen, (iv) passing the reformed gas mixture over a methanation catalyst to generate a methane rich gas, and (v) combining the methane-rich gas with the natural gas prior to the liquefaction step.

29 Claims, 2 Drawing Sheets

(51) Int. Cl.
*F25J 3/00* (2006.01)
*C07C 27/06* (2006.01)
*F25J 1/00* (2006.01)
*C01B 3/38* (2006.01)
*C10L 3/08* (2006.01)
*C10L 3/10* (2006.01)
*F25J 1/02* (2006.01)

(52) U.S. Cl.
CPC .............. *F25J 1/0229* (2013.01); *F25J 1/0278* (2013.01); *C01B 2203/0233* (2013.01); *C01B 2203/0405* (2013.01); *C01B 2203/0415* (2013.01); *C01B 2203/042* (2013.01); *C01B 2203/0445* (2013.01); *C01B 2203/0475* (2013.01); *C01B 2203/0495* (2013.01); *C01B 2203/1052* (2013.01); *C01B 2203/1058* (2013.01); *C01B 2203/1064* (2013.01); *C01B 2203/1247* (2013.01); *C01B 2203/1252* (2013.01); *C01B 2203/1258* (2013.01); *C01B 2203/127* (2013.01); *C01B 2203/1288* (2013.01); *C01B 2203/1294* (2013.01); *C01B 2203/146* (2013.01); *C01B 2203/148* (2013.01); *F25J 2210/06* (2013.01); *F25J 2220/64* (2013.01)

USPC ...... 48/197 R; 48/198.1; 48/198.3; 48/198.7; 48/61; 62/620; 62/611; 62/613; 518/700; 518/705; 422/625; 422/629; 422/630

(56) References Cited

U.S. PATENT DOCUMENTS

| | | | |
|---|---|---|---|
| 7,168,265 B2* | 1/2007 | Briscoe et al. | 62/611 |
| 2003/0136146 A1* | 7/2003 | Fischer-Calderon et al. | 62/613 |
| 2004/0248999 A1* | 12/2004 | Briscoe et al. | 518/703 |
| 2011/0174016 A1* | 7/2011 | Carnell et al. | 62/611 |
| 2013/0090505 A1* | 4/2013 | Catchpole | 585/310 |

FOREIGN PATENT DOCUMENTS

| | | |
|---|---|---|
| WO | 9801335 | 1/1998 |
| WO | 2009017414 | 2/2009 |

OTHER PUBLICATIONS

Baker, et al. "Natural Gas Processing with Membranes: An Overview," Ind. Eng. Chem. Res. 2008, 47, pp. 2109-2121.

* cited by examiner

APPARATUS AND PROCESS FOR TREATING OFFSHORE NATURAL GAS

CROSS-REFERENCE TO RELATED APPLICATIONS

This application is the U.S. National Phase application of PCT International Application No. PCT/GB2009/050678, filed Jun. 15, 2009, and claims priority of British Patent Application No. 0812699.7, filed Jul. 11, 2008, the disclosures of both of which are incorporated herein by reference in their entirety for all purposes.

FIELD OF THE INVENTION

This invention relates to a process for treating offshore natural gas, particularly stranded offshore natural gas, such as that suitable for liquefied natural gas (LNG) production, in order to increase storage capacity of valuable products, generate power and reduce flaring.

BACKGROUND OF THE INVENTION

Offshore natural gas, comprising methane and higher hydrocarbons such as ethane, propane and butane, is often recovered directly, or as an associated gas with oil production, using fixed or floating platforms coupled to well heads on the seabed. The recovered natural gas is, where generally possible, fed via pipeline to on-shore gas processing facilities where such steps as purification may be carried out. However for a significant proportion of the recovered natural gas, pipelining to on-shore facilities is not possible. In such cases it has become desirable to recover and liquefy the natural gas for sea transportation to on-shore facilities. The liquefaction processes typically include steps of cooling the natural gas to a very low temperature, which allows separation of at least some of the ethane, propane, butanes and other higher hydrocarbons from the methane. The liquefied products have different commercial values, but offshore where further processing such as cracking is not feasible, typically the ethane has the lowest value and so part is often used for power generation in the liquefaction facility and the excess is flared. Alternatively, the excess ethane may be recovered and transported with the LNG to the onshore facility. However the economics of transporting ethane in place of the more valuable liquids is less attractive. With ever-increasing pressure on maximising the utilisation of the recovered hydrocarbons coupled with a need to reduce flaring, which has become environmentally unsound, there is a need for an improved process for treating offshore natural gas.

The CRG (Catalytic Rich Gas) process, developed originally by British Gas and licensed by Davy Process Technology Ltd, utilises a combination of steam reforming, methanation and $CO_2$ removal to generate synthetic natural gases from LPG (liquefied petroleum gas) or naphtha. Alternatively, CRG steam reforming has been used as a means to lower the calorific value of LNG-derived natural gas destined for pipeline supplies.

SUMMARY OF THE INVENTION

We have realised that the CRG process may be adapted and used off-shore to overcome the problems of the previous natural gas treatment processes.

Accordingly the invention provides a process for treating offshore natural gas, comprising processing said natural gas on an off-shore processing facility by, (i) liquefying and fractionating the natural gas to generate a liquefied natural gas stream and a higher hydrocarbon stream,
(ii) vapourising at least a portion of said higher hydrocarbon stream,
(iii) passing the vapourised higher hydrocarbon stream and steam over a steam reforming catalyst to generate a reformed gas mixture comprising methane, steam, carbon oxides and hydrogen,
(iv) passing the reformed gas mixture over a methanation catalyst to generate a methane rich gas, and
(v) combining the methane-rich gas with the natural gas prior to the liquefaction step.

The present invention lies in the use of CRG technology, suitably adapted, on an off-shore gas processing facility to overcome the problem of flaring and/or storing & transporting higher hydrocarbons. Moreover processing of higher hydrocarbons with relatively high melting points, particularly C5+, in liquefaction facilities can be difficult as they can freeze and so cause blockages in the equipment. Furthermore heavy hydrocarbons are a cause of foaming and carryover from the acid gas removal unit. Reducing C5+ hydrocarbons overcomes this problem.

The invention therefore further provides apparatus for treating offshore natural gas, comprising an offshore natural gas processing facility, on which is mounted;

(i) a natural gas liquefaction unit, including fractionation equipment, configured to generate a liquefied natural gas stream and a higher-hydrocarbon stream,
(ii) vapourisation equipment operatively connected to said liquefaction unit and configured to vapourise at least a portion of said higher hydrocarbon stream,
(iii) means for adding steam to the vaporised higher hydrocarbon stream,
(iv) a reformer vessel operatively connected to the vapourisation equipment, said reformer vessel containing a reforming catalyst, configured such that the vapourised higher hydrocarbon stream and steam are passed over the catalyst to generate a reformed gas mixture comprising methane, steam, carbon oxides and hydrogen,
(v) a methanation vessel operatively connected to the reformer vessel, said methanation vessel containing a methanation catalyst configured such that the reformed gas mixture is passed over the catalyst to generate a methane-rich gas and
(vi) mixing equipment for mixing the methane-rich gas with natural gas fed to the natural gas liquefaction unit.

BRIEF DESCRIPTION OF THE DRAWINGS

The invention is further illustrated by reference to the figures in which.

DETAILED DESCRIPTION OF THE INVENTION

Figure 1:
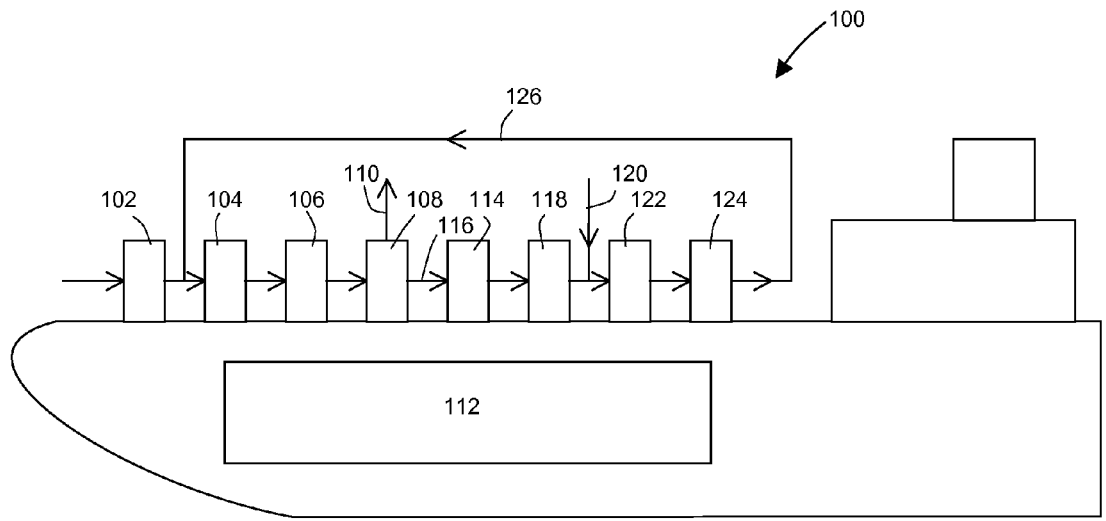
FIG. 1 depicts an arrangement of unit operations for one embodiment of an off-shore natural gas treatment facility based on a FPSO gas-processing unit.

In the first step, natural gas is recovered and provided to the offshore natural gas processing facility using conventional recovery techniques and pipeline equipment. The natural gas may be processed on an offshore natural gas recovery unit or on a separate offshore processing unit. Preferably the offshore natural gas processing facility is a fixed offshore facility or a floating offshore facility such as a floating production, storage and off-loading (FPSO) facility.

Where the natural gas contains mercury it is desirable that the process comprises a step purifying the natural gas to remove mercury upstream of the liquefaction and fractionation steps in order to protect the heat exchange equipment, which is often fabricated from aluminium, from the corrosive effect of mercury. Thus, preferably the process has a purification unit containing a purification material suitable for removing mercury, said unit installed upstream of the liquefaction step. Suitable purification materials are transition metal sulphides, particularly copper sulphide, mixed with various support materials in the form of agglomerates. Such materials are commercially available from Johnson Matthey PLC, for example as PURASPEC$_{JM}$™ 1163. Alternatively a transition metal compound, e.g. copper hydroxycarbonate, may be provided in a suitable form to the unit and sulphided in-situ by sulphur compounds present in the natural gas. The mercury removal step is preferably operated below 100° C. and at pressures up to about 150 bar abs, e.g. in the range 10-150 bar abs.

Where the natural gas contains sulphur compounds it is desirable that the process comprises a step purifying the natural gas or higher hydrocarbon streams to remove sulphur compounds upstream of the reforming step in order to protect the reforming catalyst from the poisoning effect of sulphur. Such sulphur removal may be performed on the natural gas upstream of the liquefaction and fractionation steps, or may be performed on the vapourised higher hydrocarbon stream, or on both. Thus, preferably the process comprises a purification unit containing one or more purification materials suitable for removing sulphur compounds, said unit installed upstream of the liquefaction equipment and/or the reformer vessel. The sulphur compounds may include one or more of hydrogen sulphide ($H_2S$), carbonyl carbonyl sulphide (COS), mercaptans and thiophenes. Where the sulphur compound is primarily hydrogen sulphide, this may be removed alongside $CO_2$ using a suitable membrane or an acid gas wash using a physical wash solvent such as refrigerated methanol, glycol or propylene carbonate or an aqueous amine upstream of the liquefaction equipment. Alternatively the $H_2S$ may simply be absorbed using one or more beds of sulphur absorbent such as a metal-promoted, e.g. Cu-promoted ZnO/alumina composition or ZnO composition. Where sulphur compounds other than hydrogen sulphide are present in high concentrations it may be desirable to include a first step of hydrodesulphurisation followed by a step of hydrogen sulphide absorption. In this embodiment the purification materials comprise a bed of hydrodesulphurisation catalyst located upstream of a bed of hydrogen sulphide absorbent. In hydrodesulphurisation, the natural gas and a small amount of hydrogen are passed over a Ni- and/or Co-based catalyst that converts the organo-sulphur compounds to hydrogen sulphide. Typical catalysts are alumina-supported Ni/Mo, Co/Mo, Ni/W and Co/W catalysts. Such catalysts are available commercially. The hydrogen sulphide thus generated, in addition to any hydrogen sulphide naturally present in the natural gas may then be absorbed a suitable hydrogen sulphide absorbent such as a ZnO-material. Again such absorbent materials are available commercially. The hydrodesulphurisation and hydrogen sulphide absorption are preferably carried out upstream of the reformer vessel, as then only organo-sulphur compounds reaching the reformer need to be hydrodesulphurised, allowing for smaller vessels, less demand for hydrogen and less catalyst. Where the organo-sulphur compounds include mercaptans these may be found in the ethane, propane and butane fractions. The hydrodesulphurisation catalyst may also be effective for hydrogenating olefins and converting amines to ammonia. The hydrodesulphurisation catalyst and hydrogen sulphide absorbent may be in the same or different vessels. The hydrodesulphurisation and $H_2S$ absorption is preferably operated above 150° C., more preferably above 200° C. and at pressures up to about 50 bar abs. The hydrogen required from hydrodesulphurisation may be provided from storage, separate hydrogen generator apparatus or, preferably, by recycling a portion of the reformed gas mixture.

In a preferred embodiment, heat from the methanation step is used to preheat the natural gas stream before the sulphur removal step where a hydrodesulphurisation catalyst and/or hydrogen sulphide absorbent are used. Accordingly the apparatus preferably comprises heat exchange means that transfer heat from the methanation vessel to preheat the natural gas or higher hydrocarbon before it is fed to the purification unit containing a hydrodesulphurisation catalyst and/or hydrogen sulphide absorbent.

Prior to liquefaction, the natural gas stream may be subjected to a preliminary separation stage using a membrane that separates light (small hydrocarbons) from heavier (larger hydrocarbons), thereby generating a gaseous higher hydrocarbon-rich stream. For example membranes may be used to generate a C3+ stream from the natural gas at a selectivity over methane of 5-20% (see Ind. Eng. Chem. Res., vol 47, no 7, 2008, pages 2109-2121 and references therein). By partly removing the higher hydrocarbons in this way, the burden on the liquefaction unit may be lowered, the risk of blockages caused by frozen C5+ hydrocarbons reduced and the problem of foaming in the acid gas removal unit overcome. Furthermore, the gaseous higher hydrocarbon stream separated in this in this way may be used in the vapourisation of the liquid higher hydrocarbon stream obtained from the liquefaction unit.

After the purification step and any preliminary separation stage, the natural gas is liquefied and fractionated to generate a liquefied natural gas stream and a higher hydrocarbons stream. By "higher hydrocarbons" we include one or more of ethane, propane, butanes and any C5+ parrafins, cycloalkakanes such as cyclohexane, and aromatic hydrocarbons such as benzene. Whereas the reforming step can convert all of these higher hydrocarbons to methane, it may be desirable to further fractionate the higher hydrocarbon stream to recover the commercially more-valuable components before subjecting the remaining parts to the reforming step. Thus in a preferred process, the liquefaction and fractionation step separates the natural gas into a methane-rich stream (i.e. a liquefied natural gas), an ethane stream, an LPG stream (containing propane and butanes) and a heavy stream.

Thus the apparatus comprises a natural gas liquefaction unit and one or more fractionation columns. Natural gas is preferably treated to remove any $CO_2$ and dried, before being fed to a liquefaction unit where it is cooled firstly to between −20 and −40° C. before being fed to a first fractionation column where the heavy hydrocarbons are separated from a methane-rich stream. The light fraction from the top of the column is further cooled and condensed liquids separated. Thus the higher hydrocarbons are liquefied. One or more further columns may be used on the light and heavy fractions from the first column to obtain fractions rich in methane, ethane, propane, butanes and other hydrocarbons. Methods for processing the liquefied natural gas streams in this way are described for example in U.S. Pat. No. 6,564,579. The higher hydrocarbon stream fed to the reforming step preferably comprises ethane and/or a portion of the LPG and/or a heavy stream containing C5+ paraffins. Ethane containing streams are available, therefore the higher hydrocarbon stream fed to the reforming step preferably comprises ethane and optionally a portion of the LPG and/or a heavy stream containing C5+ paraffins. Most preferably >50% by volume, preferably >75%, more preferably >90% of the higher hydrocarbons fed to the reforming step is ethane. Ethane, propane butane and other higher hydrocarbons not used in reforming may be used to generate power for the process, e.g. using a gas turbine.

The higher hydrocarbon stream is to be fed to the reformer is vapourised in a vapouriser, which advantageously may be heated using heat from the methanation step.

The vapourised higher hydrocarbon stream is then pressurised to between 10 and 50 bar abs, heated to above 200° C., preferably above 300° C., more preferably 300-520° C., most preferably 350-500° C. at pressures above 20 bar abs, mixed with steam and passed to a reformer vessel containing a reforming catalyst. The steam may be added to the vapourised higher hydrocarbon stream by direct injection or by use of a saturator. Steam may also be used to vapourise the higher hydrocarbon stream. The steam ratio should be controlled to avoid carbon deposition on the catalyst, but is typically in the range 0.2-2.0, preferably 0.2-1.0 where the feed is predominantly ethane.

The steam reforming reaction takes place adiabatically over the catalyst in the steam reformer vessel to convert the higher hydrocarbon stream to a gas mixture comprising methane, carbon monoxide, carbon dioxide, hydrogen and steam. The steam reforming catalyst is preferably a Ni catalyst or a precious metal catalyst, or a combination thereof. Suitable catalysts comprise 10-60% NiO combined with an alumina or calcium aluminate. The Ni is reduced to its active form prior to use using hydrogen or another reducing gas stream. Precious metal catalysts such as Pt, Pd, Rh or Ru catalysts on a suitable inert support, particularly Ru catalysts, can operate at higher space velocities, lower steam ratios and lower temperatures than Ni catalysts and so may be advantageous where water supplies are limited. Precious metal loading is typically 0.1-1.0% wt.

If desired, a portion of the reformed gas may be recycled, with compression, to the preheated higher hydrocarbon stream fed to the reformer vessel to act as a diluent and provide some hydrogen to inhibit carbon deposition on the catalyst. An advantage of precious metal reforming catalysts is that hydrogen-recycle to the reformer is not required to prevent carbon deposition. Another advantage is that the reformer equipment may be made more compact with precious metal catalysts due to their high activity compared to Ni catalysts.

Alternatively, as the recycled stream contains some hydrogen, the stream may provide some or all of the hydrogen required for hydrodesulphurisation, if used.

Where the reforming catalyst or other process conditions such as steam ratio permit, or if hydrodesulphurisation is not used, all of the reformed gas may be passed to the methanation step. Before the methanation step, the reformed gas mixture, or the remaining part thereof, is preferably cooled using one or more heat exchangers, which may advantageously be used to generate the steam used in the reforming step. The cooled gas is then passed to the methanation step.

The methanation step may comprise one or more methanation vessels in series, preferably one or two vessels, each containing a methanation catalyst. The methanation step is preferably carried out at pressures in the range 10 to 50 bar and at a temperature in the range 100 to 400° C., preferably 250-350° C. The methanation catalyst is preferably a Ni catalyst or a precious metal catalyst, or a combination thereof. The methanation catalyst causes a 'reverse reforming' reaction to occur where carbon monoxide and hydrogen in the reformed gas are consumed to generate methane. The methanation reaction is exothermic and desirably heat exchange means are provided after each methanation vessel to cool the methane-rich gas mixture. As stated above the heat from the methanation step may advantageously be used to pre-heat the natural gas prior to hydrodesulphurisation/hydrogen sulphide absorption and/or vapourise the higher hydrocarbon stream. By careful control of the reforming step, e.g. by controlling the exotherm and/or by using a precious metal catalyst, the hydrogen and carbon oxides content of the reformed gas may be minimised thereby reducing the demand on the methanator such that the size of the methanator may be minimised.

The reforming step generates carbon oxides, including carbon dioxide, which is not removed by methanation. Carbon dioxide freezes above the liquefaction temperatures and therefore it may be desirable to include a step of removing carbon dioxide from the methane-rich gas stream using a $CO_2$ removal unit before or after it is combined with the natural gas. Preferably the natural gas and methane-rich gas are mixed and the mixture passed through a $CO_2$ removal unit. $CO_2$ removal, also known as acid-gas removal, may be accomplished using membrane technology (e.g. based on anisotropic cellulose acetate, polyimide or perfluoropolymer membranes) or the known aqueous amine wash or physical was solvents such as cold methanol, N-methylpyrrolidone or glycol wash techniques.

Furthermore, the reforming step uses steam, which may be carried through to the methane rich gas. The steam can condense and freeze in the liquefaction equipment. Furthermore, removal of water vapour from natural gas is desirable in order to avoid the formation of hydrocarbon hydrates in the gas stream and also to avoid the water condensing out of the gas in pipelines and process equipment which may then lead to corrosion problems. Therefore it is desirable to include a step of drying the methane-rich gas before or after it is combined with the natural gas, using a drying unit. Preferably the natural gas and methane-rich gas are mixed and the mixture passed through a drying unit. Where a step of carbon dioxide removal is included, the final step of water removal is preferably performed downstream of the $CO_2$ removal unit. The drying step may be accomplished using known methods for drying synthesis gas mixtures or natural gas mixtures. Several methods of removing water to depress the dew point of natural gas are practised commercially in gas-processing plants. For example, the methane-rich or mixed gas may be cooled to below the dew point of steam using heat exchangers and the condensate removed in one or more separators. This may be performed after the methanation stage and before any $CO_2$ removal stage. Alternatively or additionally, the drying step may be accomplished contacting the gas with a bed of a solid desiccant such as a silica gel or molecular sieve, and the use of liquid desiccant compounds. In the latter case, a typical process involves contacting the wet gas stream with a glycol solution in order to strip water from the gas stream into the glycol solution. This process is known as glycol dehydration and is very widely used in gas processing operations. In some drying processes, methanol or another alcohol may be used as an alternative to glycol or as a mixture with a glycol. In order to reach the very low water levels required for efficient operation of the liquefaction unit, molecular sieve driers containing, e.g. zeolites, are preferred. The sieves may be periodically regenerated by heating. Any recovered water is preferably used to generate steam for the reforming step.

Thus by converting the higher-hydrocarbons to a methane-rich gas, which is combined with the feed to the liquefaction unit, the quantity of ethane and other low value hydrocarbons that otherwise may be flared or take up valuable storage space is reduced.

In FIG. 1 a FPSO unit 100 has mounted thereon and operatively connected to each other a mercury removal unit 102, an acid gas removal unit 104, a gas drying unit 106, and liquefaction and fractionation equipment 108, that produces a liquefied natural gas stream 110, and optionally propane, butane and condensates streams, for storage in storage tanks 112. The FPSO further has vapourising equipment 114 for vapourising the heavy hydrocarbon stream 116 from the liquefaction and fractionation equipment 108, a desulphurisation unit 118, means for adding steam 120 to the desulphurised heavy hydrocarbon stream, a reformer vessel 122 and a methanation vessel 124. The product methane-rich gas stream 126 from the methanator 124 is returned to the natural gas feed line between the mercury removal unit 102 and the acid gas removal unit 104.

Figure 2:
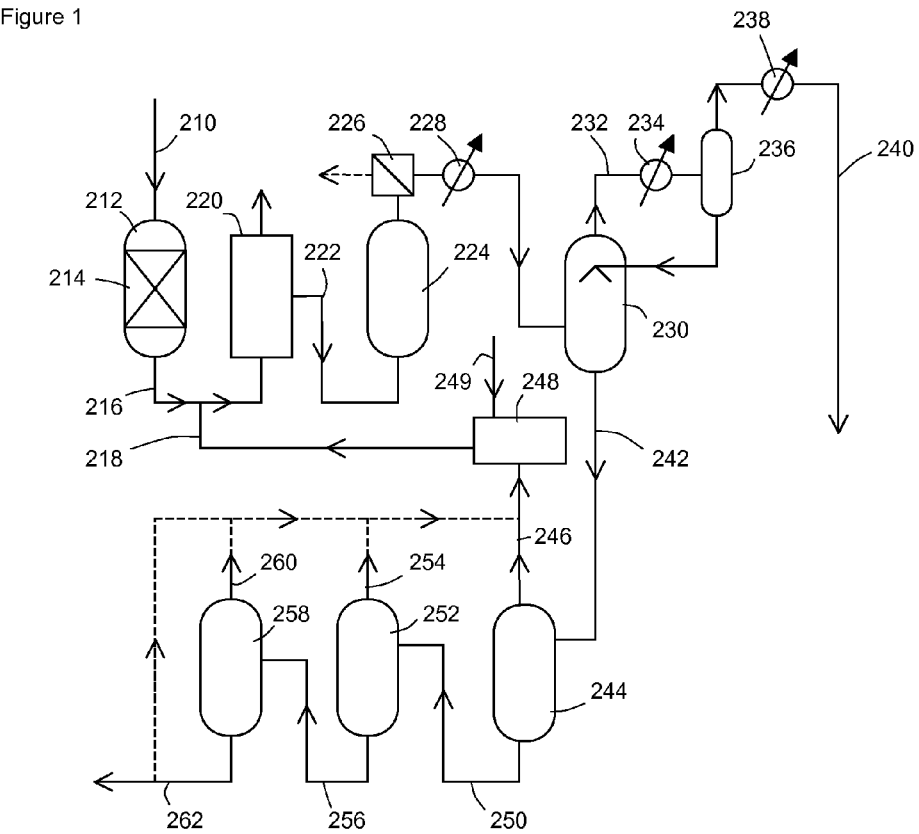
FIG. 2 depicts one embodiment of a process according to the present invention.

In FIG. 2, a natural gas feed stream 210 is passed at a temperature below 100° C. and a pressure in the range 10-100 bar abs, e.g. about 10 bar abs, to a first purification vessel 212 containing a particulate copper-sulphide based mercury absorbent 214. Mercury and other heavy metals such as arsenic are absorbed by the absorbent. The resulting gas stream 216 is mixed with a methane-rich gas stream 218 and passed through an acid-gas removal vessel 220, containing a suitable membrane that separates $CO_2$ from the gas stream. In an alternative embodiment, the acid-gas removal step uses an amine wash unit that removes the $CO_2$ and some $H_2S$ by contacting the gas with an aqueous amine solution. In yet a further an alternative embodiment, the acid-gas removal step uses an physical wash solvent unit that removes the $CO_2$ and some $H_2S$ by contacting the gas with refrigerated methanol, glycol, N-methylpyrrolidone or propylene carbonate. The resulting $CO_2$-depleted gas stream 222 is passed to drier vessel 224 where it contacts a zeolitic molecular sieve that acts as a desiccant to remove water. The dried gas stream is then cooled to between −20 and −40° C. in heat exchanger 228 which causes higher hydrocarbons to condense and the stream fed to a first fractionation column 230 where the higher hydrocarbons are separated from a methane-rich stream. The condensates include heavy components such as benzene, cyclohexane, some propane and butane and C5+ paraffins, and also some ethane and dissolved methane. The light fraction 232 from the top of the column 230 is further cooled in heat exchanger 234 and condensed liquids separated in separator 236. These liquids are returned to the column 230. The separated gas from separator 236 is then further cooled in heat exchanger 238 to form a liquefied natural gas 240. The higher hydrocarbon stream recovered from column 230 is fed via line 242 to a second fractionation column 244 (de-ethaniser) operated to recover an ethane-rich stream. The ethane stream 246 is vapourised and sent for desulphurisation, reforming and methanation in unit 248, which is fed by steam from line 249 (see FIG. 3). The resulting methane-rich gas stream passed from unit 248 via line 218 to line 216. The mixed stream 250 recovered from the bottom of the second fractionation column 244 is sent to a third column 252 (de-propaniser) where a propane-rich stream 254 is recovered. The mixed stream 256 recovered from the bottom of the third fractionation column 252 is sent to a fourth column 258 (de-butaniser) where a butane-rich stream 260, and condensates stream 262 are recovered. The propane 254, butane 260 and condensates 262 obtained from the de-propaniser 252 and debutaniser 258 respectively may be sent for storage. If desired, a portion of these streams (shown by dotted lines) may be sent to the purification, reforming and methanation stage 248 in order to generate the methane-rich gas.

In one embodiment, between drier 224 and heat exchanger 228, the purified, $CO_2$-depleted and dried natural gas stream is passed through a preliminary separation unit 226 containing a membrane that separates a portion of the higher hydrocarbon from the natural gas, thereby forming a gaseous higher hydrocarbon stream (shown by a dotted line), which is then fed to the higher hydrocarbon vapouriser.

Figure 3:
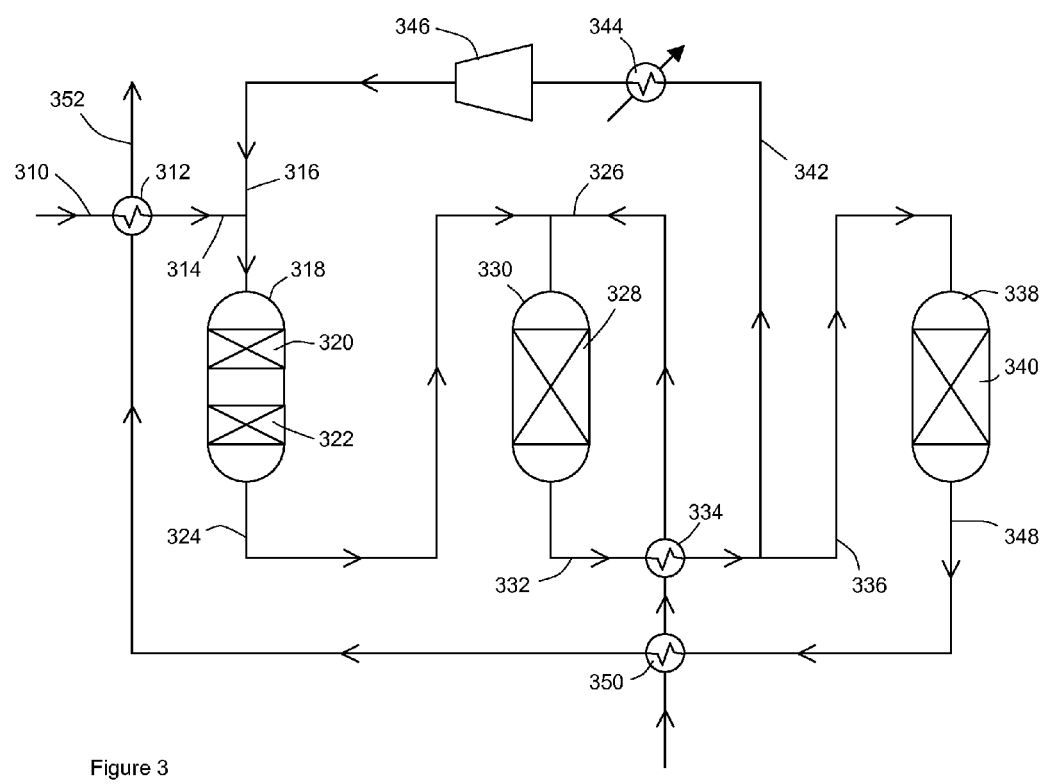
FIG. 3 depicts one embodiment of the catalytic reforming & methanation process.

In FIG. 3 an ethane-rich stream, 310 optionally containing propane, butane and/or condensates, is fed to heat exchanger 312 where it is vapourised. The resulting gas stream 314 is mixed with recycle gas 316, which contains some hydrogen, and the mixture fed at 200-400° C., preferably 250-400° C. and at 10-50 bar abs to a vessel 318 containing a bed of a Ni/Mo hydrodesulphurisation catalyst 320 over a bed of ZnO absorbent 322. The mixture contacts the hydrodesulphurisation catalyst 320 resulting in hydrogenation of the organic sulphur compounds (e.g. mercaptans) to form hydrogen sulphide. The hydrogen sulphide thus formed is then absorbed on the ZnO absorbent 322. The desulphurised gas 324 is then mixed with steam 326 at 350-400° C. and passed at 200-500° C., preferably 300-500° C., at >20 bar abs over a bed of Ni or precious metal steam reforming catalyst 328 in an adiabatic reactor 330. The steam reforming reaction takes place (alongside shift and methanation reactions in equilibrium) to form a gas mixture 332 comprising methane, hydrogen, carbon oxides and steam. This gas mixture is cooled in heat exchanger 334 to about 300° C. and fed via line 336 to methanation vessel 338 containing a bed of Ni or precious metal methanation catalyst 340. A portion of the cooled gas mixture from line 336 is taken via line 342, passed through cooling heat exchanger 344 and compressed in compressor 346 to generate the recycle stream 316. The methane-rich gas stream 348 from methanator 338 is cooled in heat exchangers 350 and then 312 to form the methane-rich gas stream 352 fed back to the natural gas feed (216 in FIG. 2). In this embodiment, heat from the methanator 338 is used to raise steam in exchanger 350 and then heat the higher hydrocarbon in heat exchanger 312. Steam in line 326 is generated using heat from the methanator in exchanger 350, followed by heat from the reformer in heat exchanger 334.

EXAMPLES

By way of example, the following three cases have been calculated using different higher hydrocarbon mixtures for feed to the reformer and methanation vessels. The amount of $CO_2$ generated for the invention is contrasted with that generated by flaring the C2+ hydrocarbons.

Example 1

5% Ethane in 100 MMSCFD Feed

|  | MMSCFD | Invention | Flare $C_2$ |
| --- | --- | --- | --- |
| Ethane Feed | 5 | | |
| Steam* | 6.69 | | |
| Produced $CO_2$ | 1.25 | 24011 te/yr | 255722 te/yr |
| Methane Product | 8.75 | | |

MMSCFD = million standard cubic feet of gas per day.

Example 2

A mixture of 5% Ethane, 3% Propane and 1% Butane in 100 MMSCFD Feed

|  | MMSCFD | Invention | Flare $C_2, C_3, C_4$ |
|---|---|---|---|
| Ethane Feed | 5 | | |
| Propane Feed | 3 | | |
| Butane Feed | 1 | | |
| Steam* | 14.75 | | |
| Produced $CO_2$ | 3.5 | 67207 te/yr | 441486 te/yr |
| Methane Product | 19.5 | | |

Example 3

A mixture of 5% Ethane, 3% Propane and 1% Butane in 600 MMSCFD Feed

|  | MMSCFD | Invention | Flare $C_2$ |
|---|---|---|---|
| Ethane Feed | 30 | | |
| Propane Feed | 18 | | |
| Butane Feed | 6 | | |
| Steam* | 163 | | |
| Produced $CO_2$ | 24 | 460916 te/yr | 1151940 te/yr |
| Methane Product | 126 | | |

*The amount of steam is based in 1.3 kg/kg steam to hydrocarbon ratio.

In each case, the use of the present invention dramatically reduces the $CO_2$ output compared to flaring.

The invention claimed is:

1. A process for treating offshore natural gas, comprising processing said natural gas on an off-shore processing facility by,
   (i) liquefying and fractionating the natural gas to generate a liquefied natural gas stream and a higher hydrocarbon stream,
   (ii) vapourising at least a portion of said higher hydrocarbon stream,
   (iii) passing the vapourised higher hydrocarbon stream and steam over a steam reforming catalyst to generate a reformed gas mixture comprising methane, steam, carbon oxides and hydrogen,
   (iv) passing the reformed gas mixture over a methanation catalyst to generate a methane rich gas, and
   (v) combining the methane-rich gas with the natural gas prior to the liquefaction step.

2. A process according to claim 1 wherein the offshore natural gas processing facility is a fixed off-shore facility or a floating off-shore facility.

3. A process according to claim 1 comprising purifying the natural gas to remove mercury upstream of the liquefaction and fractionation steps by passing the natural gas through a purification unit containing a purification material suitable for removing mercury.

4. A process according to claim 1 comprising purifying the natural gas or higher hydrocarbon streams to remove sulphur compounds upstream of the liquefaction step and/or reforming step by passing the natural gas or higher hydrocarbon streams through a purification unit containing a purification material suitable for removing sulphur compounds.

5. A process according to claim 4 wherein the purifying step to remove sulphur compounds is located upstream of the liquefaction step and the reforming step.

6. A process according to claim 1 wherein the purified natural gas stream is subjected to a preliminary separation stage using a membrane to generate a gaseous higher hydrocarbon stream.

7. A process according to claim 1 wherein the liquefaction and fractionation step separates the natural gas into a methane-rich stream, an ethane stream, an LPG stream and a heavy stream.

8. A process according to claim 7 wherein the ethane and/or a portion of the LPG and/or the heavy stream containing C5+ paraffins is fed to the reforming step.

9. A process according to claim 7 wherein the higher hydrocarbon stream fed to the reforming step comprises >50% by volume ethane.

10. A process according to claim 1 wherein the higher hydrocarbon stream is vapourised using heat from the methanation step and/or by addition of steam.

11. A process according to claim 1 wherein the reforming step is operated at a pressure in the range 10 to 50 bar and a temperature above 200° C. over a Ni catalyst or precious metal catalyst, or a combination thereof.

12. A process according to claim 1 comprising exchanging heat, in one or more heat exchangers, between the reformed gas mixture and water to generate the steam used in the reforming step.

13. A process according to claim 1 wherein the methanation step is operated at a pressure in the range 10 to 50 bar and a temperature in the range 100 to 400° C. over a Ni catalyst or a precious metal catalyst, or a combination thereof.

14. A process according to claim 1 comprising removing carbon dioxide from the methane-rich gas stream before or after it is combined with the natural gas, using a $CO_2$ removal unit.

15. A process according to claim 1 comprising drying the methane-rich gas stream before or after it is combined with the natural gas, using a drying unit.

16. Apparatus for treating offshore natural gas, comprising an offshore natural gas processing facility, on which is mounted;
    (i) a natural gas liquefaction unit, including fractionation equipment, configured to generate a liquefied natural gas stream and a higher-hydrocarbon stream,
    (ii) vapourisation equipment operatively connected to said liquefaction unit and configured to vapourise at least a portion of said higher hydrocarbon stream,
    (iii) means for adding steam to the vapourised higher hydrocarbon steam,
    (iv) a reformer vessel operatively connected to the vapourisation equipment, said reformer vessel containing a reforming catalyst, configured such that the vapourised higher hydrocarbon stream and steam are passed over the catalyst to generate a reformed gas mixture comprising methane, steam, carbon oxides and hydrogen,
    (v) a methanation vessel operatively connected to the reformer vessel, said methanation vessel containing a methanation catalyst configured such that the reformed gas mixture is passed over the catalyst to generate a methane-rich gas and
    mixing equipment upstream of the natural gas liquefaction unit that receives the methane-rich gas and natural gas being fed to the natural gas liquefaction unit.

17. Apparatus according to claim 16 wherein the offshore natural gas processing facility is a fixed off-shore facility or a floating off-shore facility.

18. Apparatus according to claim 16 comprising a purification unit containing a purification material suitable for removing mercury, said unit installed upstream of the liquefaction unit.

19. Apparatus according to claim 16 comprising a purification unit containing one or more purification materials suitable for removing sulphur compounds, said unit installed upstream of the liquefaction unit and/or reformer vessel.

20. Apparatus according to claim 16 comprising a preliminary separation unit containing a membrane, said unit being operatively connected upstream of the liquefaction unit, that separates a portion of the higher hydrocarbons from the natural gas thereby generating a gaseous higher hydrocarbon stream.

21. Apparatus according to claim 16 wherein the liquefaction and fractionation equipment is configured to separate the natural gas into a methane-rich stream, an ethane stream, an LPG stream and a heavy stream.

22. Apparatus according to claim 21 wherein the liquefaction and fractionation equipment is configure to feed the ethane and optionally a portion of the LPG and/or the heavy stream containing C5+ paraffins to the reforming step.

23. Apparatus according to claim 16 wherein the vapouriser is heated using heat from the methanation step and/or by addition of steam.

24. Apparatus according to claim 16 wherein the means for adding steam is selected from a conduit for direct addition and a saturator.

25. Apparatus according to claim 16 wherein the steam reformer is an adiabatic steam reformer containing a Ni catalyst or a precious metal catalyst, or a combination thereof.

26. Apparatus according to claim 16 comprising one or more heat exchangers configured to cool the reformed gas mixture with water thereby generating steam used in the reforming step.

27. Apparatus according to claim 16 wherein the methanation catalyst is a Ni catalyst or a precious metal catalyst, or a combination thereof.

28. Apparatus according to claim 16 comprising a $CO_2$ removal unit installed such that it removes carbon dioxide from the methane-rich gas stream before or after it is combined with the natural gas.

29. Apparatus according to claim 16 comprising a drying unit installed such that it dries the methane-rich gas stream before or after it is combined with the natural gas.

* * * * *